United States Patent
Takamatsu et al.

(10) Patent No.: US 10,914,692 B2
(45) Date of Patent: Feb. 9, 2021

(54) METHOD FOR MEASURING STRESS

(71) Applicant: Kobe Steel, Ltd., Kobe (JP)

(72) Inventors: Hiroyuki Takamatsu, Kobe (JP); Toshihide Fukui, Kobe (JP); Mariko Matsuda, Takasago (JP); Tatsuhiko Kabutomori, Takasago (JP)

(73) Assignee: Kobe Steel, Ltd., Kobe (JP)

(*) Notice: Subject to any disclaimer, the term of this patent is extended or adjusted under 35 U.S.C. 154(b) by 0 days.

(21) Appl. No.: 16/492,739

(22) PCT Filed: Apr. 6, 2018

(86) PCT No.: PCT/JP2018/014772
§ 371 (c)(1),
(2) Date: Sep. 10, 2019

(87) PCT Pub. No.: WO2018/221010
PCT Pub. Date: Dec. 6, 2018

(65) Prior Publication Data
US 2020/0072769 A1 Mar. 5, 2020

(30) Foreign Application Priority Data
May 31, 2017 (JP) .................. 2017-108134

(51) Int. Cl.
*G01N 23/20* (2018.01)
*G01N 23/20008* (2018.01)
(Continued)

(52) U.S. Cl.
CPC ..... *G01N 23/20008* (2013.01); *G01N 23/207* (2013.01); *G01N 23/2055* (2013.01); *G01N 2223/607* (2013.01)

(58) Field of Classification Search
CPC ............. G01N 23/20008; G01N 23/20; G01N 23/20058; G01N 23/2055; G01N 23/207;
(Continued)

(56) References Cited

U.S. PATENT DOCUMENTS 5,828,724 A * 10/1998 Kurtz ............... G01N 23/20041
378/70

FOREIGN PATENT DOCUMENTS

JP 50-147983 11/1975
JP 2011-27550 A 2/2011

OTHER PUBLICATIONS

International Search Report dated Jun. 26, 2018 in PCT/JP2018/014772 filed on Apr. 6, 2018.

* cited by examiner

*Primary Examiner* — Don K Wong
(74) *Attorney, Agent, or Firm* — Oblon, McClelland, Maier & Neustadt, L.L.P.

(57) ABSTRACT

A method that measures stress of a test subject including a metal includes: detecting, using a two-dimensional detector, a diffraction ring of diffracted X-rays which is formed by causing X-rays from an irradiation unit to be incident on the test subject and to be diffracted by the test subject; and calculating the stress of the test subject based on detection results during the detection step. Therein, the detection step involves causing X-rays from the irradiation unit to be incident on each of a plurality of sites on the test subject with the irradiation unit angled relative to the test subject in a manner such that the angle of incidence on the test subject is within the range of 5-20°, inclusive, and detecting, using a two-dimensional detector, the diffraction ring formed by the diffraction of the X-rays by the test subject.

8 Claims, 3 Drawing Sheets

(51) Int. Cl.
*G01N 23/2055* (2018.01)
*G01N 23/207* (2018.01)

(58) Field of Classification Search
CPC ........... G01N 2223/05; G01N 2223/00; G01N 2223/056; G01N 2223/0566
See application file for complete search history.

METHOD FOR MEASURING STRESS

TECHNICAL FIELD

The present invention relates to a method for measuring stress in a target object.

BACKGROUND ART

During these years, as can be found in PTL 1 and the like, two-dimensional detection methods (so-called cos α methods) employing a two-dimensional detector are widely used as nondestructive methods for measuring stress (residual stress) in a target object composed of a metal. In these methods, stress is measured on the basis of a diffraction ring of a diffracted X-ray generated as an X-ray incident on a target object at a certain incidence angle Ψ is diffracted from the target object. The measurement accuracy of the two-dimensional detection method is substantially proportional to sin 2Ψ and decreases as the incidence angle Ψ of an X-ray incident on a target object changes from 45°. For this reason, the incidence angle Ψ of an X-ray on a target object is usually set within a range of 25° to 65° in the two-dimensional detection methods. In PTL 1, the incidence angle Ψ is set at 30°.

Although accurate measurement can be performed using the two-dimensional detection methods if the incidence angle Ψ of an X-ray incident on a target object is within a range of 25° to 65°, an appropriate incidence angle might not be secured due to a shape of the target object or the like. When a radiation unit capable of radiating X-rays is angled relative to a target object so that the incidence angle Ψ of an X-ray on the target object falls within the range, for example, a diffracted X-ray or the radiation unit itself might interfere with the target object. In this case, it is difficult to accurately measure stress in the target object. In addition, because an effect of the surface coarseness of a target object becomes larger as the incidence angle Ψ of an X-ray becomes higher, an appropriate incidence angle Ψ might not be secured. Furthermore, the incidence angle Ψ needs to be small in order to measure stress in a deep part of a target object. Since the measurement accuracy of these measurement methods is substantially proportional to sin 2Ψ as described above, however, the measurement accuracy decreases as the incidence angle Ψ becomes lower. If the incidence angle Ψ of an X-ray on a target object cannot be set within the range of 25° to 65°, especially if the incidence angle Ψ needs to be set lower than 25° (low incidence angle), therefore, it is usually difficult to use a two-dimensional method.

CITATION LIST

Patent Literature

PTL 1: Japanese Unexamined Patent Application Publication No. 2011-27550

SUMMARY OF INVENTION

An object of the present invention is to provide a method for measuring stress capable of accurately measuring stress in a target object using a two-dimensional detection method with an incidence angle of an X-ray on the target object set within a range of 5° to 20°.

A method for measuring stress according to an aspect of the present invention is a method for measuring stress in a target object composed of a metal. The method includes the steps of causing X-rays to be incident on the target object from a radiation unit capable of radiating the X-rays and detecting, using a two-dimensional detector, diffraction rings of diffracted X-rays generated as the X-rays are diffracted from the target object and calculating the stress in the target object on a basis of a result of the step of detecting. In the step of detecting, the X-rays are caused to be incident on a plurality of parts of the target object from the radiation unit with the radiation unit angled relative to the target object such that an incidence angle of the X-rays on the target object falls within a range of 5° to 20° and the two-dimensional detector detects the diffraction rings generated as the X-rays are diffracted from the target object.

In addition, a method for measuring stress according to another aspect of the present invention is a method for measuring stress in a target object composed of a metal. The method includes the steps of causing X-rays to be incident on the target object from a radiation unit capable of radiating the X-rays and detecting, using a two-dimensional detector, diffraction rings of diffracted X-rays generated as the X-rays are diffracted from the target object and calculating stress in the concavity on a basis of a result of the step of detecting. In the step of detecting, the X-rays are caused to be incident on a certain part of the target object from the radiation unit at a plurality of different incidence angles including a certain incidence angle selected from a range of 5° to 20° and the two-dimensional detector detects the diffraction rings generated as the X-rays are diffracted from the certain part.

DESCRIPTION OF EMBODIMENTS

Preferable embodiments of the present invention will be described hereinafter with reference to the drawings.

First Embodiment

Figure 1:
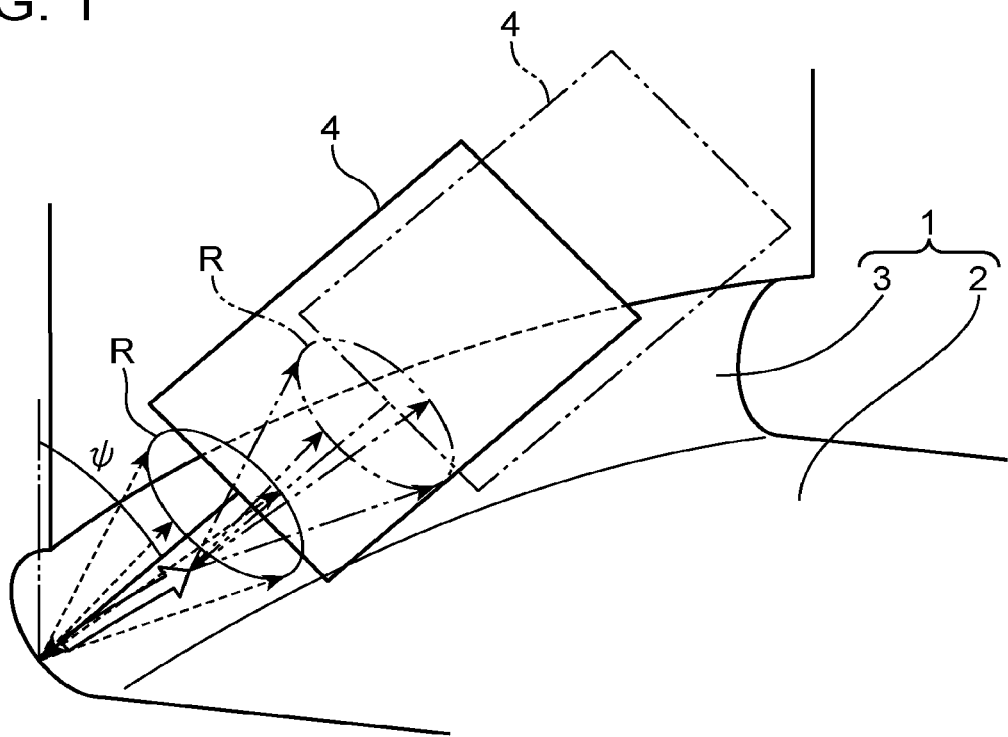
FIG. 1 is a schematic diagram illustrating a detection step of a method for measuring stress according to a first embodiment of the present invention.

A method for measuring stress according to a first embodiment of the present invention will be described with reference to FIG. 1. In the method for measuring stress, stress in a target object 1 (a crank shaft, etc.) composed of a metal such as steel is measured using a two-dimensional detector (not illustrated). The target object 1 has a shape that interferes with a radiation unit 4 that is capable of radiating X-rays and that is angled relative to the target object 1 such that an incidence angle of an X-ray radiated from the radiation unit 4 on the target object 1 becomes larger than 25° or a diffracted X-ray, which is the X-ray radiated from the radiation unit 4 and diffracted from the target object 1, and that separates from the radiation unit 4 angled relative to the target object 1 such that the incidence angle of the X-ray on the target object 1 becomes equal to or smaller than 25° or the diffracted X-ray, which is the X-ray radiated from the radiation unit 4 and diffracted from the target object 1. More specifically, as illustrated in FIG. 1, the target object 1 includes a surface 2 and a concavity 3 in the surface 2 extending like a groove. In the present embodiment, a case where stress in the concavity 3 of the target object 1 is measured will be described. That is, in the present embodiment, if the radiation unit 4 is angled relative to the concavity 3 such that an incidence angle Ψ of an X-ray becomes larger than 25°, the radiation unit 4 interferes with the surface 2 of the target object 1 or a diffracted X-ray interferes with a boundary between the concavity 3 and the surface. A part to be measured is not limited to the concavity 3. The method for measuring stress includes a detection step and a calculation step.

In the detection step, X-rays radiated from the radiation unit 4, which is capable of radiating X-rays, are incident on the concavity 3, and the two-dimensional detector detects diffraction rings R of diffracted X-rays generated as the X-rays are diffracted from the concavity 3. More specifically, in the detection step, the radiation unit 4 radiates X-rays onto a plurality of parts of the concavity 3 at a certain incidence angle Ψ with the radiation unit 4 angled relative to the target object 1 such that the certain incidence angle Ψ of the X-rays on the concavity 3 falls within a range of 5° to 20° (low incidence angles), and the two-dimensional detector detects the diffraction rings R generated as the X-rays are diffracted from the concavity 3. At this time, the target object 1 may be fixed and the radiation unit 4 may move, or the radiation unit 4 may be fixed and the target object 1 may move. In addition, as the plurality of parts, continuous parts of the concavity 3 of the concavity 3 are selected. More preferably, parts continuous in a direction in which the concavity 3 extends are selected. In the detection step, the radiation unit 4 successively causes X-rays to be incident on the continuous parts at a certain incidence angle Ψ, and the two-dimensional detector detects a single diffraction ring R obtained by superimposing together a plurality of diffraction rings R generated as the X-rays are diffracted from the parts. The area of the X-rays radiated onto the continuous parts of the concavity 3 is preferably set a certain number of times (e.g., 15,000 times) larger than the grain size of the target object 1.

In the calculation step, stress in the concavity 3 is calculated on the basis of a result (the single diffraction ring R) of the detection performed in the detection step.

As described above, in the method for measuring stress according to the present embodiment, the radiation unit 4 is angled relative to the target object 1 in the detection step such that the incidence angle of X-rays on the target object 1 falls within the range of 5° to 20° (low incidence angles). As a result, even if the target object 1 has a shape with which the radiation unit 4 interferes with the target object 1 when the radiation unit 4 is angled relative to the target object 1 such that the incidence angle of X-rays on the target object 1 becomes larger than 25°, stress in the target object 1 can be effectively measured. Furthermore, since a plurality of diffraction rings R, each of which corresponds to each of the X-rays incident on a plurality of parts of the target object 1, are detected in the detection step, the amount of diffraction information (information regarding crystals involved in diffraction) included in a result of the detection performed in the detection step increases compared to when only one diffraction ring R corresponding to a single X-ray incident on the target object 1 is detected. As a result, the accuracy of calculating stress in the target object 1 in the calculation step improves.

In addition, since parts of the concavity 3 continuous in the direction in which the concavity 3 extends are selected as the plurality of parts in the detection step, the accuracy of measuring stress in the concavity 3 further improves. More specifically, because stress in the concavity 3 is considered to be substantially uniform in the direction in which the concavity 3 extends, the measurement accuracy improves by detecting diffraction rings R for parts continuous in the direction.

Alternatively, parts of the concavity 3 separate from one another in the direction in which the concavity 3 extends may be selected in the detection step as the plurality of parts of the concavity 3 on which X-rays incident, and a plurality of diffraction rings R generated as the incident X-rays are diffracted from the parts may be detected. In this case, an average of a plurality of values (values of stress) detected from the diffraction rings R is calculated in the calculation step. When parts of the concavity 3 continuous in the direction in which the concavity 3 extends are selected as the plurality of parts and X-rays are successively incident on the parts as in the above embodiment, however, operations to be performed in the detection step are simpler than when X-rays are incident on a plurality of parts of the concavity 3 separate from one another, because measurement conditions need not be set for each of the parts.

Second Embodiment

Next, a method for measuring stress according to a second embodiment of the present invention will be described with reference to FIG. 2. In the second embodiment, only differences from the first embodiment will be described, and description of the same structures, operations, and effects as in the first embodiment is omitted.

Figure 2:
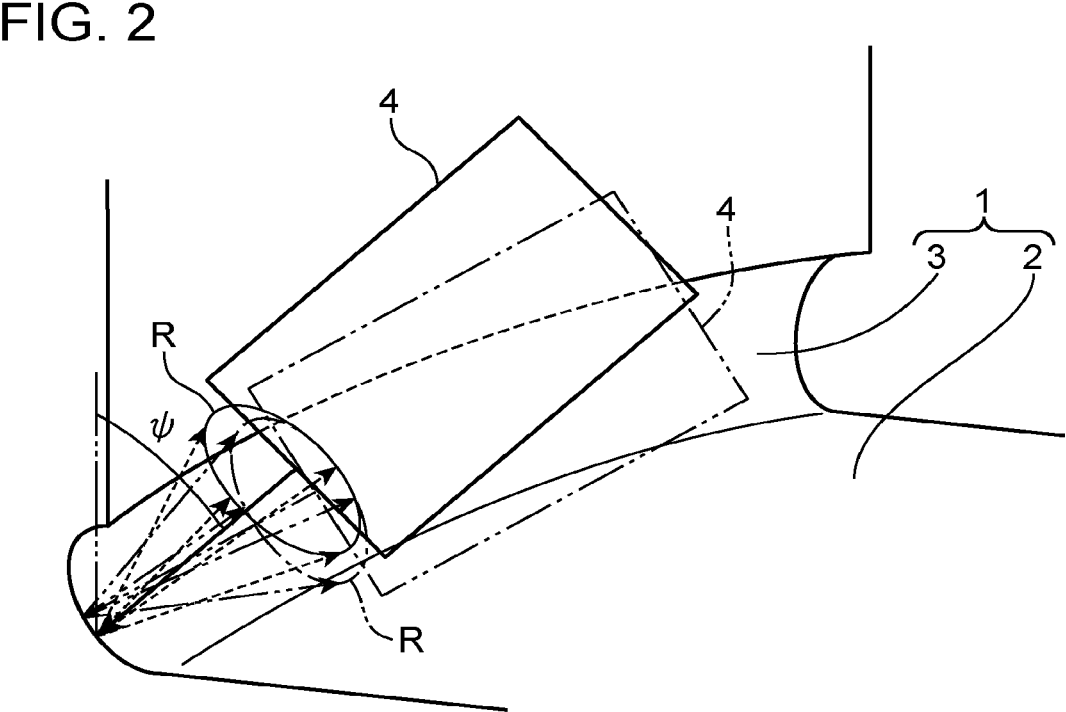
FIG. 2 is a schematic diagram illustrating a detection step of a method for measuring stress according to a second embodiment of the present invention.

In the detection step according to the present embodiment, as illustrated in FIG. 2, the radiation unit 4 radiates X-rays onto a single part of the concavity 3 at a plurality of different incidence angles including a certain incidence angle Ψ selected from a range of 5° to 20°, and the two-dimensional detector detects diffraction rings R generated as the X-rays are diffracted from the concavity 3. The plurality of incidence angles Ψ are selected from a range whose lower limit is the certain incidence angle Ψ and whose upper limit is an incidence angle Ψ obtained by adding a certain angle to the certain incidence angle Ψ. In the present embodiment, in the detection step, X-rays are successively incident on the concavity 3 from the lower limit to the upper limit, or from the upper limit to the lower limit, of the range and the two-dimensional detector detects a single diffraction ring obtained by superimposing together a plurality of diffraction rings generated as the X-rays are diffracted from the concavity 3.

As described above, in the method for measuring stress according to the present embodiment, X-rays are radiated onto the target object 1 in the detection step at the plurality of different incidence angles Ψ including the certain incidence angle Ψ selected from the range of 5° to 20°. As a result, even if the target object 1 has a shape with which the radiation unit 4 interferes with the target object 1 when the radiation unit 4 is angled relative to the target object 1 such that the incidence angles of the X-rays on the target object 1 become larger than 25°, stress in the target object 1 can be effectively measured. Furthermore, since the two-dimensional detector detects, in the detection step, a plurality of diffraction rings R, each of which corresponds to each of the plurality of X-rays incident at the plurality of different incidence angles Ψ, the amount of diffraction information (information regarding crystals involved in diffraction) included in a result of the detection performed in the detection step increases compared to when only one diffraction ring corresponding to an X-ray incident on the target object 1 at a single incidence angle is detected. As a result, the accuracy of calculating stress in the concavity 3 in the calculation step improves.

In addition, since the plurality of incidence angles Ψ are selected in the detection step from the range whose lower limit is the certain incidence angle Ψ and whose upper limit is the incidence angle Ψ obtained by adding the certain angle to the certain incidence angle Ψ, a large amount of diffraction information can be obtained near a part on which X-rays are incident at the certain incidence angle Ψ. As a result, the measurement accuracy improves.

EXAMPLES

Now, examples of the above embodiments will be sequentially described. In the examples, a test sample (10 mm×10 mm) cut out from the target object 1 was used. As the target object 1, an object composed of CrMo-based low-alloy steel was used. Cr-Kα having a wavelength of 0.117 mm was used as X-rays incident on the test sample from the radiation unit 4, and a beam diameter σ of the X-rays was about 1.5 mm. A μ-X360 manufactured by Pulstec Industrial Co., Ltd. was used as the radiation unit 4.

In the detection step in the examples, the X-rays were incident on the test sample with stress applied to the test sample by a four-point bending test machine, and the two-dimensional detector detected diffraction rings (2θ≤156°) on a diffraction plane of Fe(2, 1, 1). θ denotes a diffraction angle. In the calculation step, stress was calculated on the basis of a result of the detection.

Example of First Embodiment

Figure 3:
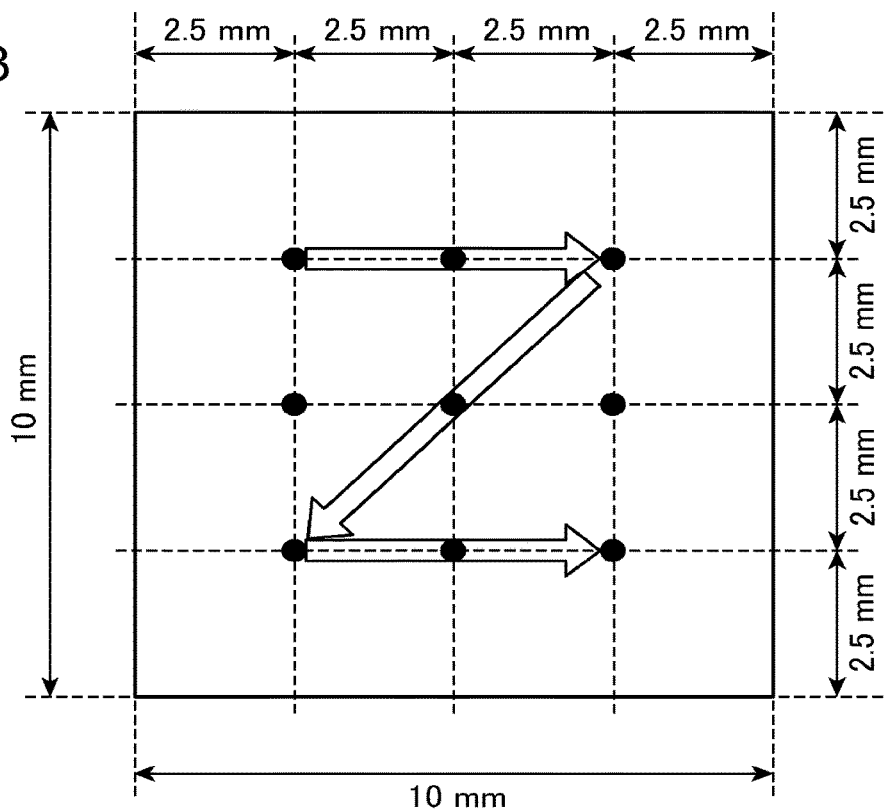
FIG. 3 is a diagram illustrating an example of a moving direction of incident X-rays in a first example.
Figure 4:
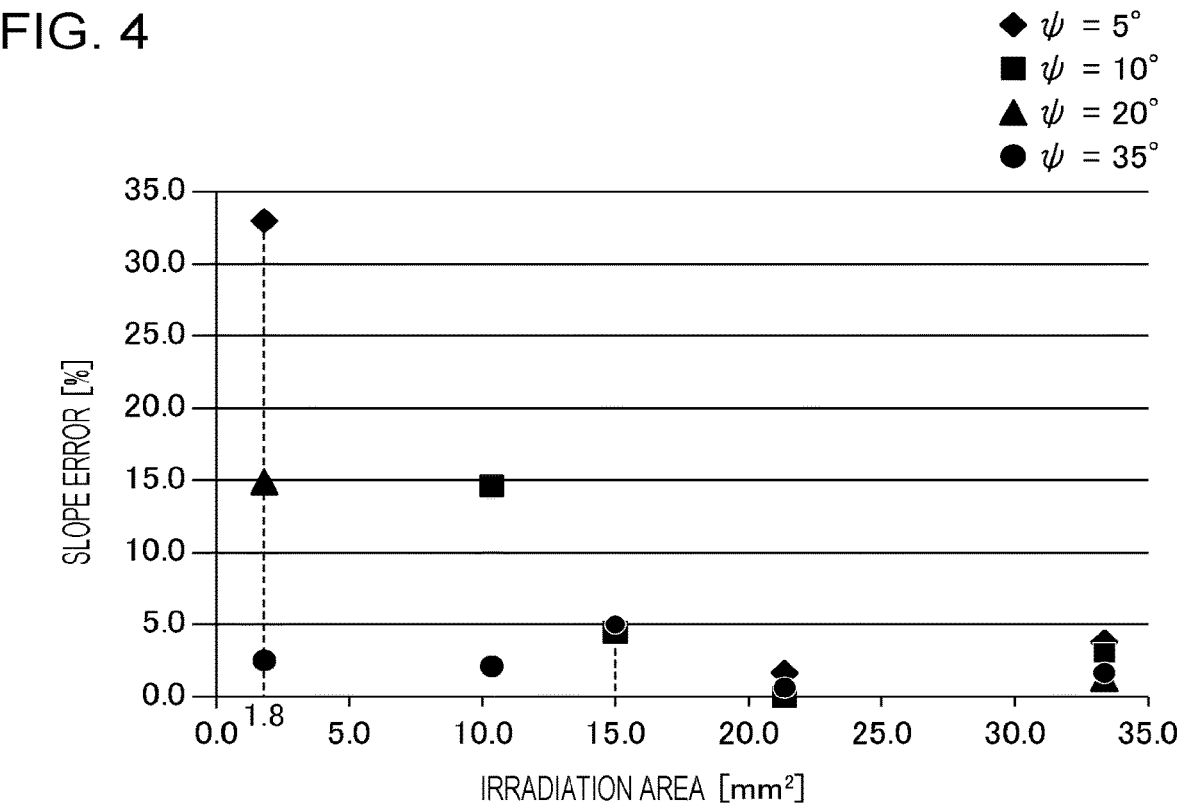
FIG. 4 is a graph illustrating a relationship (CrMo-based low-alloy steel) between irradiation area achieved by the incident X-rays and a slope error.

First, the example of the first embodiment will be described with reference to FIGS. 3 and 4. FIG. 3 illustrates an example of a moving direction of X-rays incident on the test sample. FIG. 4 is graph illustrating a relationship between irradiation area achieved by the X-rays and a slope error at a time when the incidence angle Ψ of the incident X-rays was 5°, 10°, 20°, and 35°. The slope error indicates an error in a measured value from actually applied stress (a value obtained by a strain gauge attached to the test sample). When the slope error is small, therefore, it can be evaluated that accurate measurement has been performed.

As illustrated in FIG. 4, it can be seen that at low incidence angles (5°, 10°, and 20°), the slope error decreases (the measurement accuracy improves) as the irradiation area increases from one (about 1.8 mm² in this example) achieved by a single X-ray. This is because the amount of diffraction information obtained from diffracted X-rays increases as the irradiation area achieved by the X-rays increases.

It can also be seen that the slope error at a low incidence angle when the irradiation area achieved by the X-rays is 15 mm² or larger is substantially the same as that at a high incidence angle (35°), which can be evaluated as achieving a relatively high accuracy. That is, it has been found that even when the incidence angle Ψ of the incident X-rays is low, measurement can be performed with substantially the same accuracy as when a single X-ray is radiated at a high incidence angle by radiating the X-rays over an area of 15 mm² or more in this example. The irradiation area is more than about 15,000 times larger than the grain area (about 0.001 mm² in this example) of the test sample. That is, it has been found that measurement can be performed with substantially the same accuracy as when a single X-ray is radiated at a high incidence angle by radiating X-rays onto a test sample while setting the total irradiation area achieved by the X-rays more than 15,000 times larger than the grain area of the test sample.

Example of Second Embodiment

Figure 5:
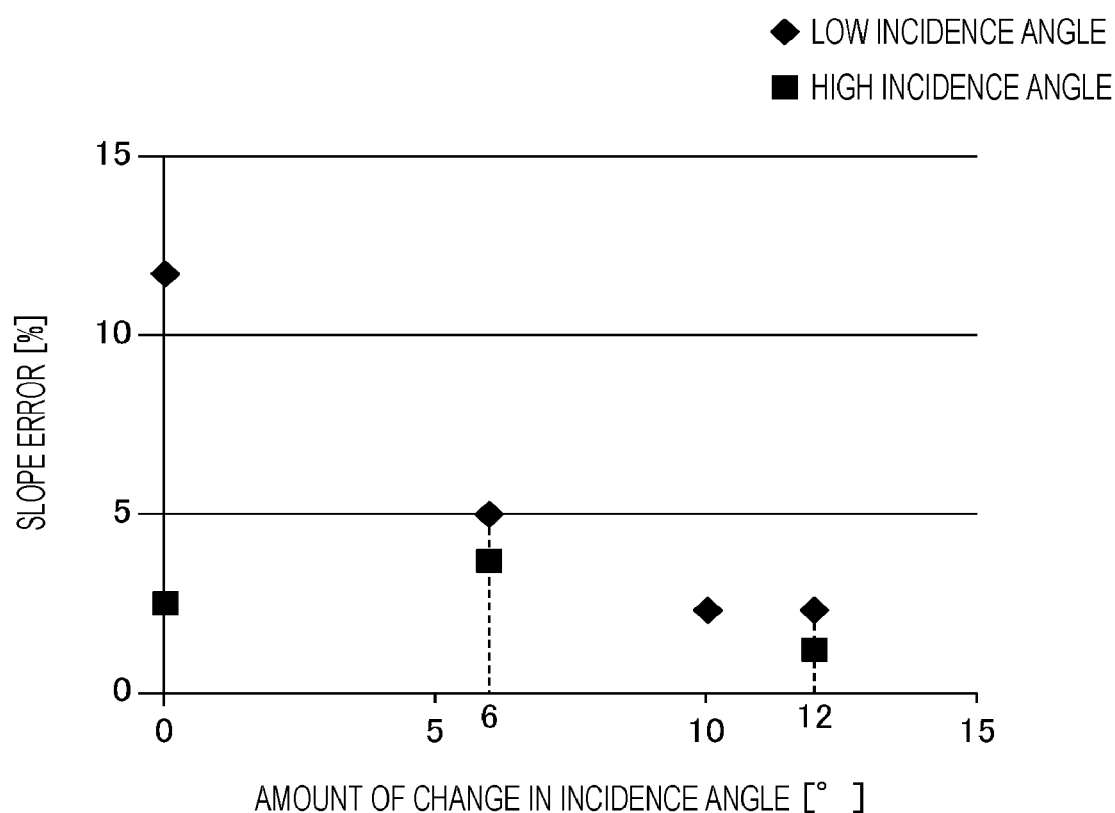
FIG. 5 is a graph illustrating a relationship (CrMo-based low-alloy steel) between an oscillation angle of incident X-rays and reliability.

Next, the example of the second embodiment will be described with reference to FIG. 5. FIG. 5 is a graph illustrating a relationship between the amount of change in the incidence angle Ψ of incident X-rays (the angle added to the incidence angle Ψ) and the slope error at a time when the incidence angle Ψ of the incident X-rays was low and high. A value of the slope error when the amount of change in the incidence angle was 6°, for example, indicates an error from a value obtained by a strain gauge based on diffraction rings R generated by successively changing the incidence angle Ψ within a range of a certain incidence angle selected from low incidence angles to an incidence angle obtained by adding 6° to the certain incidence angle.

It can be seen from FIG. 5 that at low incidence angles, the slope error decreases (the measurement accuracy improves) as the amount of change in the incidence angle Ψ increases. This is because the amount of diffraction information obtained from diffracted X-rays increases by changing the incidence angle Ψ within the range.

It can also be seen that at low incidence angles, the slope error when the amount of change in the incidence angle Ψ is 6° or larger is substantially the same as that at high incidence angles, which can be evaluated as achieving a relatively high accuracy. That is, it has been found that even when the incidence angle Ψ of incident X-rays is low, measurement can be performed with substantially the same accuracy as when a single (zero oscillation angle) X-ray is incident at a high incidence angle by radiating the X-rays while changing the incidence angle Ψ within a range obtained by adding 6° or more to the incidence angle Ψ.

The above embodiments will be schematically described.

The method for measuring stress according to the first embodiment is a method for measuring stress in a target object composed of a metal. The method includes the steps of causing X-rays to be incident on the target object from a radiation unit capable of radiating the X-rays and detecting, using a two-dimensional detector, diffraction rings of diffracted X-rays generated as the X-rays are diffracted from the target object and calculating the stress in the target object on a basis of a result of the step of detecting. In the step of detecting, the X-rays are caused to be incident on a plurality of parts of the target object from the radiation unit with the radiation unit angled relative to the target object such that an incidence angle of the X-rays on the target object falls within a range of 5° to 20° and the two-dimensional detector detects the diffraction rings generated as the X-rays are diffracted from the target object.

In the method for measuring stress, the radiation unit is angled relative to the target object such that the incidence angle of the X-rays on the target object falls within the range of 5° to 20° (low incidence angles) in the step of detecting. Even if the target object has a shape with which the radiation unit interferes with the target object when the radiation unit is angled relative to the target object such that the incidence angle of the X-rays on the target object becomes larger than 25°, therefore, stress in the target object can be effectively measured. Furthermore, since the plurality of diffraction rings corresponding to the X-rays incident on the plurality of parts of the target object are detected in the step of detecting, the amount of diffraction information (information regarding crystals involved in diffraction) included in the result of the step of detecting increases compared to when only one diffraction ring corresponding to a single X-ray incident on the target object is detected. As a result, the accuracy of calculating stress in the target object in the step of calculating increases.

In this case, in the step of detecting, continuous parts of the target object are preferably selected as the plurality of parts and the X-rays are preferably caused to be successively incident on the parts.

In doing so, the accuracy of measuring stress in the target object further increases, and operations performed in the step of detecting are simplified. More specifically, because stress in the target object is substantially uniform in the continuous parts, the measurement accuracy improves by detecting diffraction rings in these parts. In addition, unlike when X-rays are individually radiated onto parts of the target object separate from one another, measurement conditions need not be set for each of the parts, and the operations in the step of detecting are simplified.

Furthermore, in this case, in the step of detecting, the X-rays are preferably caused to be successively incident on the continuous parts and the two-dimensional detector preferably detects a single diffraction ring obtained by superimposing together the diffraction rings generated as the X-rays are diffracted from the parts.

In doing so, the step of detecting is further simplified.

In addition, in the step of detecting, the X-rays are preferably caused to be incident on the target object such that total irradiation area of the target object achieved by the X-rays becomes a certain number of times larger than grain area of the target object.

In doing so, the amount of information included in the result of the step of detecting further increases, and the measurement accuracy further increases.

In addition, a method for measuring stress according to the second embodiment is a method for measuring stress in a target object composed of a metal. The method comprising the steps of causing X-rays to be incident on the target object from a radiation unit capable of radiating the X-rays and detecting, using a two-dimensional detector, diffraction rings of diffracted X-rays generated as the X-rays are diffracted from the target object and calculating stress in the concavity on a basis of a result of the step of detecting. In the step of detecting, the X-rays are caused to be incident on a certain part of the target object from the radiation unit at a plurality of different incidence angles including a certain incidence angle selected from a range of 5° to 20° and the two-dimensional detector detects the diffraction rings generated as the X-rays are diffracted from the certain part.

In the method for measuring stress, the X-rays are radiated onto the target object at the plurality of different incidence angles including the certain incidence angle selected from the range of 5° to 20° in the step of detecting. Even if the target object has a shape with which the radiation unit interferes with the target object when the radiation unit is angled relative to the target object such that the incidence angles of the X-rays on the target object become larger than 25°, therefore, stress in the target object can be effectively measured. Furthermore, since the two-dimensional detector detects the plurality of diffraction rings corresponding to the X-rays incident at the plurality of different incidence angles in the step of detecting, the amount of diffraction information (information regarding crystals involved in diffraction) included in the result of the step of detecting increases compared to when only one diffraction ring corresponding to a single X-ray incident on the target object is detected. As a result, the accuracy of calculating stress in a concavity in the step of calculating increases.

In this case, in the step of detecting, the plurality of incidence angles are preferably selected from a range whose lower limit is the certain incidence angle and whose upper limit is an incidence angle obtained by adding a certain angle to the certain incidence angle.

In doing so, it becomes possible in the step of detecting to obtain a large amount of diffraction information near a part onto which the X-rays are radiated at the certain incidence angle. As a result, the measurement accuracy improves.

In addition, in the method for measuring stress according to the first embodiment or the second embodiment, in the step of detecting, an object having a shape that interferes with the radiation unit angled relative to the object such that the incidence angle(s) of the X-rays radiated from the radiation unit on the object becomes larger than 25° or diffracted X-rays, which are the X-rays radiated from the radiation unit and diffracted from the object, and that separates from the radiation unit angled relative to the object such that the incidence angle(s) of the X-rays on the object becomes equal to or smaller than 25° or the diffracted X-rays, which are the X-rays radiated from the radiation unit and diffracted from the object, is preferably used as the target object.

The invention claimed is:

1. A method for measuring stress in a target object composed of a metal, the method comprising:
   causing X-rays to be incident on the target object from a radiation unit capable of radiating the X-rays and detecting, using a two-dimensional detector, diffraction rings of diffracted X-rays generated as the X-rays are diffracted from the target object; and
   calculating the stress in the target object on a basis of a result of the detecting,
   wherein, in the detecting, the X-rays are caused to be incident on a plurality of parts of the target object from the radiation unit with the radiation unit angled relative to the target object such that an incidence angle of the X-rays on the target object falls within a range of 5° to 20° and the two-dimensional detector detects the diffraction rings generated as the X-rays are diffracted from the target object.

2. The method for measuring stress according to claim 1, wherein, in the detecting, continuous parts of the target object are selected as the plurality of parts and the X-rays are caused to be successively incident on the parts.

3. The method for measuring stress according to claim 2, wherein, in the detecting, the X-rays are caused to be successively incident on the continuous parts and the two-dimensional detector detects a single diffraction ring obtained by superimposing together the diffraction rings generated as the X-rays are diffracted from the parts.

4. The method for measuring stress according to claim 1, wherein, in the detecting, the X-rays are caused to be incident on the target object such that total irradiation area of the target object achieved by the X-rays becomes a certain number of times larger than grain area of the target object.

5. A method for measuring stress in a target object composed of a metal, the method comprising:
   causing X-rays to be incident on the target object from a radiation unit capable of radiating the X-rays and detecting, using a two-dimensional detector, diffraction rings of diffracted X-rays generated as the X-rays are diffracted from the target object; and
   calculating stress in a concavity on a basis of a result of the detecting,
   wherein, in the detecting, the X-rays are caused to be incident on a certain part of the target object from the radiation unit at a plurality of different incidence angles including a certain incidence angle selected from a range of 5° to 20° and the two-dimensional detector detects the diffraction rings generated as the X-rays are diffracted from the certain part.

6. The method for measuring stress according to the claim 5,
   wherein, in the detecting, the plurality of incidence angles are selected from a range whose lower limit is the certain incidence angle and whose upper limit is an incidence angle obtained by adding a certain angle to the certain incidence angle.

7. The method for measuring stress according to claim 1,
   wherein, in the detecting, an object having a shape that interferes with the radiation unit angled relative to the object such that the incidence angle of the X-rays radiated from the radiation unit on the object becomes larger than 25° or diffracted X-rays, which are the X-rays radiated from the radiation unit and diffracted from the object, and that separates from the radiation unit angled relative to the object such that the incidence angle of the X-rays on the object becomes equal to or smaller than 25° or the diffracted X-rays, which are the X-rays radiated from the radiation unit and diffracted from the object, is used as the target object.

8. The method for measuring stress according to claim 5,
   wherein, in the detecting, an object having a shape that interferes with the radiation unit angled relative to the object such that the incidence angles of the X-rays radiated from the radiation unit on the object become larger than 25° or diffracted X-rays, which are the X-rays radiated from the radiation unit and diffracted from the object, and that separates from the radiation unit angled relative to the object such that the incidence angles of the X-rays on the object become equal to or smaller than 25° or the diffracted X-rays, which are the X-rays radiated from the radiation unit and diffracted from the object, is used as the target object.

* * * * *